(12) United States Patent
Van Bommel et al.

(10) Patent No.: US 12,508,334 B2
(45) Date of Patent: Dec. 30, 2025

(54) DISINFECTION SYSTEM COMPRISING AN OPTICAL ARRANGEMENT FOR A FAR UV LIGHT SOURCE TO FILTER OUT UNDESIRED WAVELENGTHS

(71) Applicant: SIGNIFY HOLDING B.V., Eindhoven (NL)

(72) Inventors: Ties Van Bommel, Horst (NL); Joris Jan Vrehen, Waalre (NL); Anna Wilhelmina Maria De Best, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 363 days.

(21) Appl. No.: 18/269,792

(22) PCT Filed: Dec. 21, 2021

(86) PCT No.: PCT/EP2021/087093
§ 371 (c)(1),
(2) Date: Jun. 27, 2023

(87) PCT Pub. No.: WO2022/144246
PCT Pub. Date: Jul. 7, 2022

(65) Prior Publication Data
US 2024/0050608 A1   Feb. 15, 2024

(30) Foreign Application Priority Data
Jan. 4, 2021   (EP) .................................. 21150015

(51) Int. Cl.
*A61L 2/10*   (2006.01)

(52) U.S. Cl.
CPC ............. *A61L 2/10* (2013.01); *A61L 2202/11* (2013.01); *A61L 2209/12* (2013.01)

(58) Field of Classification Search
CPC ..... A61L 2/10; A61L 2202/11; A61L 2209/12
See application file for complete search history.

(56) References Cited

U.S. PATENT DOCUMENTS

| 2006/0261291 A1 | 11/2006 | Gardner |
| 2016/0122553 A1 | 5/2016 | Yu et al. |
| (Continued) | | |

FOREIGN PATENT DOCUMENTS

| CN | 111529727 A | 8/2020 |
| EP | 0240005 A2 | 10/1987 |
| (Continued) | | |

*Primary Examiner* — Christopher E Dunay (57) ABSTRACT

The invention provides a radiation generating system comprising a radiation unit, wherein the radiation unit comprises a light source, a first collimator, and an optical arrangement, wherein: (a) the light source is configured to generate light source radiation having a first spectral power distribution having an intensity $I1,1$ at a first wavelength $\lambda 1$ and an intensity $I1,2$ at a second wavelength $\lambda 2$; (b) the first collimator is configured in a light receiving relationship with the light source, wherein the first collimator is configured to collimate the light source radiation into collimated light source radiation; (c) the optical arrangement is configured downstream of the first collimator and is configured to convert the collimated light source radiation into arrangement radiation; wherein the arrangement radiation is collimated relative to the collimated light source radiation; wherein the optical arrangement comprises a second collimator and an optical filter, wherein: (i) the second collimator is configured downstream or upstream of the optical filter; (ii) the optical filter has a higher transmission for the first wavelength $\lambda 1$ than for the second wavelength $\lambda 2$ when irradiated under a predefined angle; (iii) the first wavelength $\lambda 1$ is selected from the range of 190-230 nm and the second wavelength $\lambda 2$ is selected from the range of 100-190 nm or 230-280 nm; and (iv) the second collimator is at least partly (Continued)

defined by a plurality of light radiation transmissive channels, wherein the radiation transmissive channels are defined by channel walls which comprise a light absorbing material, wherein the light absorbing material is configured to absorb at least part of the collimated light source radiation received by the light absorbing material.

15 Claims, 2 Drawing Sheets

(56) References Cited

U.S. PATENT DOCUMENTS

| | | |
|---|---|---|
| 2017/0289524 A1 | 10/2017 | Pacala et al. |
| 2018/0226541 A1 | 8/2018 | Lee et al. |
| 2020/0215214 A1 | 7/2020 | Rosen et al. |
| 2024/0082441 A1* | 3/2024 | Van Bommel ............ A61L 2/10 |
| 2024/0181114 A1* | 6/2024 | Van Bommel ............ A61L 2/10 |
| 2024/0197937 A1* | 6/2024 | Van Bommel ....... H05B 47/105 |
| 2025/0052402 A1* | 2/2025 | Oepts ...................... A61L 2/085 |
| 2025/0073361 A1* | 3/2025 | Van Bommel ............ A61L 2/10 |
| 2025/0170288 A1* | 5/2025 | Van Bommel ............ F21V 7/22 |

FOREIGN PATENT DOCUMENTS

| | | |
|---|---|---|
| JP | 2020009858 A | 1/2020 |
| WO | 2004000371 A2 | 12/2003 |

* cited by examiner

DISINFECTION SYSTEM COMPRISING AN OPTICAL ARRANGEMENT FOR A FAR UV LIGHT SOURCE TO FILTER OUT UNDESIRED WAVELENGTHS

CROSS-REFERENCE TO PRIOR APPLICATIONS

This application is the U.S. National Phase application under 35 U.S.C. § 371 of International Application No. PCT/EP2021/087093, filed on Dec. 21, 2021, which claims the benefit of European Patent Application No. 21150015.2, filed on Jan. 4, 2021. These applications are hereby incorporated by reference herein.

FIELD OF THE INVENTION

The invention relates to a radiation generating system. Further, the invention relates to a method for treating at least part of a space or of an object.

BACKGROUND OF THE INVENTION

Sources of radiation are known in the art. US2006/02619291, for instance, describes an apparatus for selectively emitting one or more of a plurality of wavelength distributions of radiation, comprising: a primary UV radiation source, disposed in a housing, wherein said primary UV radiation source produces a primary wavelength distribution; at least one wavelength-transforming material, deposed external to the envelope of said primary UV radiation source, that in response to irradiation by said primary UV radiation source, emits a transformed radiation; a selection mechanism deposed internal to the housing, wherein said selection mechanism is substantially non-removably coupled to the housing; wherein said selection mechanism places at least one selected portion of said at least one wavelength-transforming materials relative to said primary UV radiation source; a reflector unit disposed proximate to said primary UV radiation source wherein said reflector unit directs the primary wavelength distribution radiation from said primary UV radiation source onto said at least one wavelength-transforming material; and wherein said reflector unit is also deposed relative to said primary UV radiation source such that non-selected portions of said at least one wavelength-transforming materials are shaded from irradiation by said primary UV radiation source. Said wavelength transforming filter is constructed to form an opening in at least a portion of said wavelength transforming filter thereby permitting said primary wavelength distribution to emit there-thru unattenuated.

SUMMARY OF THE INVENTION

Ultraviolet (UV) light has been used for disinfection for over 100 years. Wavelengths between about 100 nm and 380 nm may be strongly absorbed by nucleic acids, which may result in defects in an organism's genome. This may be desired for killing bacteria and viruses, but may also have undesired side effects for humans. Therefore the selection of wavelength of radiation, intensity of radiation and duration of irradiation may be limited in environments where people may reside such as offices, public transport, cinema's, restaurants, shops, etc., thus limiting the disinfection capacity. Especially in such environments, additional measures of disinfection may be advantageous to prevent the spread of bacteria and viruses such as influenza or novel (corona) viruses like COVID-19, SARS and MERS.

The ultraviolet wavelength range is defined as light in a wavelength range from 100 nm to 380 nm and can be divided into different types of UV light/UV wavelength ranges (Table 1). Different UV wavelengths of radiation may have different properties and thus may have different compatibility with human presence and may have different effects when used for disinfection (Table 1).

TABLE 1

Properties of different types of UV wavelength light

| Name | Short name | Wavelength (nm) | (Relative) sterilization/ inactivation effectiveness | | Safe Radiation | Vitamin D generation | Ozone generation |
| --- | --- | --- | --- | --- | --- | --- | --- |
| | | | Bacteria | Viruses | | | |
| Violet | V | 380-420 | +/− | − | + | | |
| Ultra-violet A | UV-A | 315-380 | + | − | + | | |
| Ultra-violet B | UV-B | 280-315 | + | +/− | +/− | + | |
| Near ultra-violet C | Near UV-C | 230-280 | + | + | − | | |
| Far ultra-violet | Far UV | 190-230 | + | + | + | | +/− |
| Extreme ultra-violet C | Extreme UV-C | 100-190 | + | + | − | | + |

Each UV type/wavelength range may have different benefits and/or drawbacks. Relevant aspects may be (relative) sterilization effectiveness, safety (regarding radiation), vitamin D production (in a skin of a human being or animal), and ozone production (as result of its radiation). Depending on an application a specific type of UV light or a specific combination of UV light types may be selected and provides superior performance over other types of UV light. UV-A may be (relatively) safe and may kill bacteria, but may be less effective in killing viruses. UV-B may be (relatively) safe when a low dose (i.e. low exposure time and/or low intensity) is used, may kill bacteria, and may be moderately effective in killing viruses. UV-B may also have the additional benefit that it can be used effectively in the production of vitamin D in a skin of a person or animal. Near UV-C may be relatively unsafe, but may effectively kill bacteria and viruses. Far UV may also be effective in killing bacteria and viruses, but may be (relatively to other UV-C wavelength ranges) (rather) safe. Far-UV light may generate some ozone which may be harmful for human beings and animals. Extreme UV-C may also be effective in killing bacteria and viruses, but may be relatively unsafe. Extreme UV-C may generate ozone which may be undesired when exposed to human beings or animals. In some application ozone may be desired and may contribute to disinfection, but then its shielding from humans and animals may be desired. Hence, in the table "+" for ozone production especially implies that ozone is produced which may be useful for disinfection applications, but may be harmful for humans/animals when they are exposed to it. Hence, in many applications this "+" may actually be undesired while in others, it may be desired.

It appears desirable to produce systems, that provide radiation having specifically selected wavelengths only. It may be possible, for instance, to use a light source, a collimator and an interference filter. However, the selectivity of the interference filter may depend on the angle of incidence. Although a collimator is used upstream of the interference filter, the rays may not be fully parallel. This may lead to a variety in angles of incidence, which may result in transmission of undesired wavelengths through the interference filter. In case of UV light, this may lead to people being unintentionally exposed to less desirable radiation.

Hence, it is an aspect of the invention to provide an alternative system which preferably further at least partly obviates one or more of above-described drawbacks. The present invention may have as object to overcome or ameliorate at least one of the disadvantages of the prior art, or to provide a useful alternative.

Therefore, in a first aspect the invention provides a (UV) radiation generating system comprising a (UV) radiation unit. Especially, the (UV) radiation unit may comprise a light source. In embodiments, the (UV) radiation unit may further comprise a first collimator. Especially, the (UV) radiation unit may further comprise an optical arrangement. In specific embodiments, the (UV) radiation unit may comprise a light source, a first collimator, and an optical arrangement. In embodiments, the light source may be configured to generate light source radiation having a first spectral power distribution having an intensity $I_{1,1}$ (which may also be indicated as "primary intensity") at a first wavelength $\lambda_1$ and an intensity $I_{1,2}$ (which may also be indicated as "secondary intensity") at a second wavelength $\lambda_2$, wherein $2 \leq I_{1,1}/I_{1,2} \leq 100$. In embodiments, the first collimator may be configured in a light receiving relationship with the light source, wherein the first collimator is configured to collimate the light source radiation into collimated light source radiation. In embodiments, the optical arrangement may be configured downstream of the first collimator and is configured to convert the collimated light source radiation into arrangement radiation. Especially, the arrangement radiation may be collimated relative to the collimated light source radiation. In embodiments, the optical arrangement may comprise a second collimator and an optical filter. In embodiments, the second collimator may be configured downstream of the optical filter. Alternatively, the second collimator may be configured upstream of the optical filter. Especially, the optical filter may have a higher transmission for the first wavelength $\lambda_1$ than for the second wavelength $\lambda_2$ when irradiated under a predefined angle. In embodiments, the first wavelength $\lambda_1$ may be selected from the range of 190-230 nm, such as 200-230 nm, like 200-222 nm. In embodiments, the second wavelength $\lambda_2$ may be selected from the range of 100-200 nm, such as from the range of 100-190 nm. Additionally or alternatively, the second wavelength $\lambda_2$ may be selected from the range of 230-280 nm, like from the range of 222-280 nm. Especially, the second collimator may be at least partly defined by a plurality of light radiation transmissive channels, wherein the radiation transmissive channels may be defined by channel walls. Especially, the channel walls may comprise a light absorbing material, wherein the light absorbing material may be configured to absorb at least part of the collimated light source radiation received by the light absorbing material. Therefore, in specific embodiments the invention provides a (UV) radiation generating system comprising a radiation unit, wherein the radiation unit comprises a light source, a first collimator, and an optical arrangement, wherein: (a) the light source is configured to generate light source radiation having a first spectral power distribution having an intensity $I_{1,1}$ at a first wavelength $\lambda_1$ and an intensity $I_{1,2}$ at a second wavelength $\lambda_2$; (b) the first collimator is configured in a light receiving relationship with the light source, wherein the first collimator is configured to collimate the light source radiation into collimated light source radiation; (c) the optical arrangement is configured downstream of the first collimator and is configured to convert the collimated light source radiation into arrangement radiation; wherein the arrangement radiation is collimated relative to the collimated light source radiation; wherein the optical arrangement comprises a second collimator and an optical filter, wherein: (i) the second collimator is configured downstream or upstream of the optical filter; (ii) the optical filter has a higher transmission for the first wavelength $\lambda_1$ than for the second wavelength $\lambda_2$ when irradiated under a predefined angle; (iii) the first wavelength $\lambda_1$ is selected from the range of 190-230 nm and the second wavelength $\lambda_2$ is selected from the range of 100-190 nm or 230-280 nm; and (iv) the second collimator is at least partly defined by a plurality of light radiation transmissive channels, wherein the radiation transmissive channels are defined by channel walls which comprise a light absorbing material, wherein the light absorbing material is configured to absorb at least part of the collimated light source radiation received by the light absorbing material.

Such a system may provide a higher accuracy for the wavelengths that may escape from the system. Especially for UV radiation, exposure of people to less desirable radiation, such as wavelengths in the range of 100-190 nm or in the range of 230-280 nm may be avoided by selecting safe(r) wavelengths. The second collimator may further limit the angular distribution of the radiation that exits the optical arrangement. In this way, the wavelength selection by the system may be more precise as only radiation under the predefined angle (or range of angles) of the optical filter may exit the system. The undesired wavelengths that might pass an optical filter under angles different from the predefined angle (or range of angles) may now be absorbed by the second collimator.

In embodiments, the (UV) radiation may be used for disinfection of one or more of (i) bacteria, and (ii) viruses. In embodiments, the intensity of the radiation may be defined as radiant flux, in Watt, for instance measured in an integrating sphere, or with a goniometer. Germicidal effectiveness and photobiological safety limits may depend on irradiance levels. In embodiments, the intensity of the radiation may be defined as irradiance, in Watt per square meter. In embodiments, the irradiance may be measured at a predefined distance and a predefined angle to the optical axis, especially in embodiments 1 meter from the light source at an angle of 20° to the optical axis. However, in embodiments other intensity parameters may also be used, as herein especially relative intensities are applied. In specific embodiments, in an operational mode, the irradiance may be in the range of 1 μW/cm²-10 mW/cm², for instance especially at 1 meter from the light source (even more especially within an angle of 20° to the optical axis). Hence, in embodiments the system may also be indicated as "disinfection system".

In embodiments, the light source may comprise any source of radiation that emits in the UV wavelength range. The system of the invention is especially relevant for light sources emitting non-parallel irradiation and having a range of wavelengths. Especially, in embodiments the light source may comprise a mercury discharge lamp, such as a low pressure mercury discharge lamp, a medium pressure mercury discharge lamp or a high pressure mercury discharge lamp. Depending on the pressure of the mercury discharge lamp, the emitted radiation may have one or more emission peaks at 184 nm, 254 nm, 365 nm, 405 nm, 436 nm, 546 nm, 578 nm, and 650 nm. Alternatively, the light source may comprise one or more of an excimer (or exciplex) discharge based light source. In embodiments, the light source may comprise a KrBr excimer lamp which may provide radiation at 207 nm±15 nm. In alternative embodiments, the light source may comprise a KrCl excimer lamp which may provide radiation at 222 nm±15 nm. In alternative embodiments, the light source may comprise a Zn vapor discharge lamp which may provide radiation at 214 nm±15 nm. The wavelength ranges indicated above may be based on the full-width at half maximum (FWHM) of the emission bands. In specific embodiments, the light source may comprise an excimer discharge based light source.

The term "light source" may also refer to a plurality of the same or a plurality of different light sources. Hence, e.g. the term "excimer discharge based light source" may also refer to a plurality of excimer discharge based light sources.

The first collimator may be configured downstream of the light source, especially in a light receiving relationship with the light source. The first collimator may in embodiments comprise a reflective collimator, especially a light reflective collimator. The first collimator may especially narrow the beam of radiation. The beam width may be expressed in the full width of the beam at half its maximum intensity (FWHM). In embodiments, the light source may emit in substantially all directions. The first collimator essentially redirects part of the light source radiation into collimated light source radiation directed to the optical arrangement. Some light source radiation may already be directed to the optical arrangement and may not interact with the first collimator. Hence, the radiation that enters the optical arrangement, may be both light source radiation and collimated (light source) radiation. Especially, collimated (light source) radiation may refer to either light source radiation directed to the optical arrangement or collimated light source radiation directed to the optical arrangement or to a combination of both. Hence, in embodiments the collimated light source radiation is collimated relative to the light source radiation. The term "collimated" in this context indicates that the beam is more collimated than upstream of the collimator, it does not necessarily indicate that all rays are essentially parallel. Note that the arrangement radiation is (again) collimated relative to the collimated light source radiation (see also below).

Especially, the optical arrangement is configured downstream of the first collimator and the light source. As the first collimator in embodiments may comprise a reflective collimator, the light source may be positioned in between the first collimator and the optical arrangement. The optical arrangement may receive the collimated radiation from the first collimator (and light source radiation from the light source) and convert this radiation into arrangement radiation. In embodiments, the arrangement radiation may (thus) be more collimated relative to the collimated light source radiation. Collimated radiation may refer to radiation having a more narrow angular distribution downstream of the collimator compared to upstream of the collimator. The collimated radiation may have a larger angular distribution than parallel radiation.

In embodiments, the optical arrangement may comprise a second collimator. Especially, the second collimator may comprise a light absorbing collimator (as it may in embodiments receive part of the light that impinges on the second collimator). The second collimator may be at least partly defined by a plurality of radiation transmissive channels. Such radiation transmissive channels may be defined by channel walls which may in embodiments comprise a light absorbing material. Additionally or alternatively, the channel walls may comprise a light absorbing coating. In this way, the second collimator may absorb at least part of the collimated light source radiation and light source radiation that is received by the light absorbing channel walls. Embodiments of the light absorbing material will be discussed in more detail below. The second collimator may (thus) be different from the first collimator.

In embodiments, the optical arrangement may further comprise an optical filter. The optical filter may have a higher transmission for the first wavelength $\lambda_1$ than for the second wavelength $\lambda_2$, especially when irradiated under the predefined angle (or range of angles). The optical filter may be selected for absorbing undesired wavelengths and transmitting desired wavelengths. Hence, in specific embodiments the optical filter may have a high(er) transmission for safe UV radiation. Especially, the first wavelength $\lambda_1$ may be selected from the range of 190-230 nm and the second wavelength $\lambda_2$ may selected from one or more of the range of 100-190 nm or the range of 230-280 nm.

In specific embodiments, the optical filter may comprise an interference filter. Interference filters are well known in the art. The interference filter may specifically transmit wavelengths in the range of 190-230 nm at the predefined angle. The interference filter may specifically absorb wavelengths in the range of 100-190 nm at the predefined angle. Additionally or alternatively, the interference filter may specifically reflect wavelengths in the range of 100-190 nm at the predefined angle. Especially, the interference filter may have a lower transmission for a wavelength in the range of 100-190 nm. Additionally or alternatively, the interference filter may specifically absorb wavelengths in the range of 230-280 nm at the predefined angle, or have a lower transmission for a wavelength in such range. The specificity of interference filters depends on the angle of incidence. Radiation at an angle of incidence that differs from the predefined angle, may be subjected to different transmission and absorption behavior of the interference filter. The term "predefined angle" may especially refer to a range of angles at which the optical filter absorbs the specified wavelengths.

In the system of the invention, the second collimator may be configured to absorb radiation having an angle of incidence that differs from the predefined angle.

As indicated above, the second collimator may in embodiments be configured upstream of the optical filter, such as the interference filter. In this way, radiation having an angle of incidence that differs from the predefined angle, may be absorbed by the second collimator before reaching the optical filter. Hence, only irradiation at the predefined angle may reach the optical filter and may be filtered accordingly. Alternatively, the second collimator may in embodiments be configured downstream of the optical filter. In this way, radiation at an angle of incidence that differs from the predefined angle, may pass the optical filter (possibly having an undesired wavelength) and subsequently be absorbed by the second collimator. Hence, only irradiation that passed the optical filter at the predefined angle, and thus is filtered accordingly, may pass the second collimator.

Hence, in specific embodiments, the second collimator may be configured downstream of the optical filter, and the optical filter may comprise an interference filter. In alternative embodiments, the second collimator may be configured upstream of the optical filter; and the optical filter may comprise an interference filter.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The terms "radiationally coupled" or "optically coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material. The term "in a light-receiving relationship" does, as indicated above, not exclude the presence of intermediate optical elements, such as lenses, collimators, reflectors, dichroic mirrors, etc. In embodiments, the term "light-receiving relationship" and "downstream" may essentially be synonyms.

The phrases "a wavelength", "the wavelength", "one or more wavelengths", "first wavelength $\lambda_1$" and "second wavelength $\lambda_2$" may especially indicate one wavelength or multiple wavelengths. Hence, the terms "a wavelength", "the wavelength", "one or more wavelengths", "first wavelength $\lambda_1$" and "second wavelength $\lambda_2$" may especially refer to a plurality of wavelengths, such as a wavelength range of at least 3 nm, especially a wavelength range of at least 5 nm, such as a wavelength range of at least 10 nm, like a wavelength range of at least 20 nm (within the range of 190-230 nm). Hence, the term "first wavelength $\lambda_1$" may also refer to a plurality of wavelengths selected from the range of 190-230 nm, or even mean the whole wavelength range of 190-230 nm, and the term "second wavelength $\lambda_2$" may also refer to a plurality of wavelengths selected from one or more of the range of 100-190 nm or the range of 230-280 nm, or even mean the individual or combined whole wavelength ranges of 100-190 nm and 230-280 nm. When the term "first wavelength $\lambda_1$" is interpreted as the whole wavelength range of 190-230 nm, then intensity $I_{1,1}$ at the first wavelength $\lambda_1$ is to be interpreted as the sum of all intensities of the wavelengths in the 190-230 nm range. When the term "second wavelength $\lambda_2$" is interpreted as the whole wavelength range of 100-190 nm and/or 230-280 nm, then intensity $I_{1,2}$ at the second wavelength $\lambda_2$ is to be interpreted as the sum of all intensities of the wavelengths in the 100-190 nm and/or 230-280 nm range.

Hence, the phrase "the first wavelength $\lambda_1$ selected from the range of 190-230 nm and the second wavelength $\lambda_2$ selected from the range of 100-190 nm or 230-280 nm", and similar phrases, may also indicate "one or more first wavelengths $\lambda_1$ selected from the range of 190-230 nm and one or more second wavelengths $\lambda_2$ selected from the ranges of 100-190 nm and/or 230-280 nm.

In embodiments, at the predefined angle, the transmission for the first wavelength may at least be two times higher than for the second wavelength. Alternatively or additionally, in embodiments the transmission for the first wavelength may be at least 20% and the transmission for the second wavelength may be at maximum 10%. In alternative embodiments, the transmission for the first wavelength may be at least 50% and the transmission for the second wavelength may be at maximum 20%, such as at maximum 10%.

In specific embodiments, the term "first wavelength" may refer to a wavelength range, such as a range of at least 5 nm, such as a range of at least 10 nm, with in embodiments the first wavelength in the middle of this range. In such embodiments, the afore-mentioned transmission applies to the full wavelength range in relation to the first wavelength(s).

In specific embodiments, the term "second wavelength" may refer to a wavelength range, such as a range of at least 5 nm, such as a range of at least 10 nm, even more especially at least 20 nm, with in embodiments the second wavelength in the middle of this range. In such embodiments, the afore-mentioned transmission applies to the full wavelength range in relation to the second wavelength(s).

In specific embodiments, the term "second wavelength" may refer to two wavelengths, one selected from the range of 100-190 nm and one selected from the wavelength range of 230-280 nm.

In specific embodiments, the term "second wavelength" may refer to two wavelength ranges, one selected from the range of 100-190 nm and one selected from the wavelength range of 230-280 nm, and each wavelength range of the second wavelength individually selected from e.g. a range of at least 5 nm, such as a range of at least 10 nm, even more especially at least 20 nm, with in embodiments the second wavelength in the middle of this range. In such embodiments, the afore-mentioned transmission applies to the full wavelength ranges in relation to the second wavelength(s).

Especially, in embodiments a light transmissive material, such as the optical filter, has a light transmission in the range of 50-100%, especially in the range of 70-100%, for light having a wavelength selected from the UV wavelength range. Herein, the UV wavelength range especially relates to light having a wavelength selected from the range 100-380 nm, more especially selected from the range 190-230 nm.

Especially, a light absorbing material has a light absorbance in the range of 50-100%, especially in the range of 70-100%, for light having a wavelength selected from the UV wavelength range. As can be derived from the above, this may apply for a wavelength range of at least 100 nm, especially a wavelength range of at least 250 nm, such as a wavelength range of at least 300 nm (within the range of 380-780 nm).

Especially, a light reflective material has a light reflectivity in the range of 50-100%, especially in the range of 70-100%, for light having a wavelength selected from the visible wavelength range. As can be derived from the above, this may apply for a wavelength range of at least 3 nm, especially a wavelength range of at least 5 nm, such as a wavelength range of at least 10 nm, like a wavelength range of at least 20 nm (within the range of 100-380 nm).

Note that a material may be reflective for one or more first wavelengths and absorb one or more second wavelengths, which may e.g. be the case with colored material. The term "light reflective material" may herein especially refer to materials which have a relatively high reflection, such as at least 70%, over a relatively high wavelength range, such as at least 3 nm, especially a wavelength range of at least 5 nm, such as a wavelength range of at least 10 nm, like a wavelength range of at least 20 nm, e.g. metal reflectors.

The transmission T (or light permeability) can be determined by providing light at a specific wavelength with a first intensity $I_1$ to the light transmissive material under perpendicular radiation and relating the intensity of the light $I_2$ at that wavelength measured after transmission through the material, to the first intensity of the light provided at that specific wavelength to the material, thus $T=I_2/I_1$. Likewise, the reflectivity R can be determined by relating the intensity of the light $I_3$ at that wavelength measured after reflection by the material, to the first intensity of the light $I_1$ provided at that specific wavelength to the material. Thus $R=I_3/I_1$. The absorbance A may in embodiments be defined as $A=1-(T+R)$ (see also E-208 and E-406 of the CRC Handbook of Chemistry and Physics, 69th edition, 1088-1989).

In specific embodiments, a material may be considered transmissive when the transmission of the radiation at a wavelength or in a wavelength range is larger than the reflectivity and absorbance (at that wavelength or in that wavelength range), thus when T≥R and T>A, especially wherein T/R≥1.2 and T/A≥1.2. In specific embodiments, a material may be considered reflective when the reflectivity of the radiation at a wavelength or in a wavelength range is larger than the transmission and absorbance (at that wavelength or in that wavelength range), thus when R≥T and R≥A, especially wherein R/T≥1.2 and R/A≥1.2. In specific embodiments, a material may be considered absorbing when the absorbance of the radiation at a wavelength or in a wavelength range is larger than the transmission and reflectivity (at that wavelength or in that wavelength range), thus when A>T and A>R, especially wherein A/T≥1.2 and A/R≥1.2. Here, T, R, and A refer to percentages.

In specific embodiments, a material may be considered transmissive when the transmission of the radiation at a wavelength or in a wavelength range, especially at a wavelength or in a wavelength range of radiation generated by a source of radiation as herein described, through a 1 mm thick layer of the material, especially even through a 5 mm thick layer of the material, under perpendicular irradiation with said radiation is at least about 20%, such as at least 40%, like at least 60%, such as especially at least 80%, such as at least about 85%, such as even at least about 90%.

The light transmissive material has light guiding or wave guiding properties. Hence, the light transmissive material is herein also indicated as waveguide material or light guide material. The light transmissive material will in general have (some) transmission of one or more of (N)UV, visible and (N)IR radiation, such as in embodiments at least visible light, in a direction perpendicular to the length of the light transmissive material.

The transmission of the light transmissive material (as such) for one or more luminescence wavelengths may be at least 80%/cm, such as at least 90%/cm, even more especially at least 95%/cm, such as at least 98%/cm, such as at least 99%/cm. This implies that e.g. a 1 $cm^3$ cubic shaped piece of light transmissive material, under perpendicular irradiation of radiation having a selected luminescence wavelength (such as a wavelength corresponding to an emission maximum of the luminescence of the luminescent material of the light transmissive material), will have a transmission of at least 95%.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

In addition to a high transmission for the wavelength(s) of interest, also the scattering for the wavelength(s) may especially be low. Hence, the mean free path for the wavelength of interest only taking into account scattering effects (thus not taking into account possible absorption may be at least 0.5 times the length of the body, such as at least the length of the body, like at least twice the length of the body. For instance, in embodiments the mean free path only taking into account scattering effects may be at least 5 mm, such as at least 10 mm. The wavelength of interest may especially be the wavelength at maximum emission of the luminescence of the luminescent material. The term "mean free path" is especially the average distance a ray will travel before experiencing a scattering event that will change its propagation direction.

Especially, the light transmissive element may in embodiments have an absorption length and/or a scatter length of at least the length (or thickness) of the light transmissive element, such as at least twice the length of the light transmissive element. The absorption length may be defined as the length over which the intensity of the light along a propagation direction due to absorption drops with 1/e. Likewise, the scatter length may be defined as the length along a propagation direction along which light is lost due to scattering and drops thereby with a factor 1/e. Here, the length may thus especially refer to the distance between a first face and a second face of the light transmissive element, with the light transmissive material configured between the first face and second face.

Herein, when an element is indicated to be transmissive this may in embodiments imply that at one or more wavelengths the part of the radiation that is transmitted may be larger than the part of the radiation that is reflected or absorbed. Herein, when an element is indicated to be reflective this may in embodiments imply that at one or more wavelengths the part of the radiation that is reflected may be larger than the part of the radiation that is transmitted or absorbed.

The term "luminescent material" may especially refer to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise up-converter luminescent material, i.e. radiation of a larger wavelength is converted into radiation with a smaller wavelength ($\lambda_{ex} > \lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials.

As described above, the invention may apply to any radiation generating system comprising a light source that may be configured to generate light source radiation having one or more wavelengths in the UV wavelength range (such as 100-380 nm). In embodiments, the radiation generating system may comprise a disinfection system. In embodiments, the system of the invention may be configured to generate arrangement radiation which may especially comprise the first wavelength Especially, the system may in embodiments comprise a light source having a spectral power distribution having an intensity $I_{1,1}$ at a first wavelength $\lambda_1$ and an intensity $I_{1,2}$ at a second wavelength $\lambda_2$ wherein $I_{1,1}/I_{1,2} \geq 2$, especially $I_{1,1}/I_{1,2} \geq 3$. In this way, the radiation generating system may be more efficient compared to light sources having a lower (relative) intensity $I_{1,1}$ at a first wavelength $\lambda_1$. Additionally or alternatively, the system may in embodiments comprise a light source having a spectral power distribution having an intensity $I_{1,1}$ at a first wavelength $\lambda_1$ and an intensity $I_{1,2}$ at a second wavelength $\lambda_2$ wherein $I_{1,1}/I_{1,2} \leq 100$, such as $I_{1,1}/I_{1,2} \leq 50$, especially wherein $I_{1,1}/I_{1,2} \leq 20$, more especially wherein $I_{1,1}/I_{1,2} \leq 15$. In this way, the radiation system may be more relevant as there may actually be radiation to filter. Hence, $2 \leq I_{1,1}/I_{1,2} \leq 100$, and in specific embodiments, $2 \leq I_{1,1}/I_{1,2} \leq 50$, especially $2 \leq I_{1,1}/I_{1,2} \leq 20$, more especially $3 \leq I_{1,1}/I_{1,2} \leq 20$.

In embodiments, an optical axis $O_1$ of the collimated light source radiation may be aligned with an normal N to the optical filter. The optical axis $O_1$ of the collimated light source radiation may be defined as an imaginary axis that runs through a center of the light source and through the second collimator. The optical axis may thus be parallel to the radiation transmissive channels and channel walls of the second collimator. The normal N to the optical filter may be defined as an axis perpendicular to a surface of the optical filter configured for the incidence of the collimated radiation. Hence, in specific embodiments, the radiation generating system may be configured such that the optical axis $O_1$ of the collimated light source radiation and the normal (N) to the optical filter have a first angle $\alpha_1$ equal to 0°. Especially wherein $\alpha_1 \leq 30°$, like $\alpha_1 \leq 20°$, such as $\alpha_1 \leq 10°$.

Especially, the optical axis may be defined as an imaginary line that defines the path along which light propagates through the system starting from the light generating element, here especially the light source.

In embodiments wherein the optical axis $O_1$ of the collimated light source radiation may be aligned with an normal N to the optical filter, part of the radiation of the second wavelength $\lambda_2$ (the undesired wavelengths) may be reflected by the filter. This reflected radiation may be reflected back into the light source and/or first collimator and may be recycled. As this recycling may especially occur for the undesired wavelengths, this recycling is undesired as it may reduce the effectiveness of the optical filter. Alternatively, the radiation generating system may in embodiments be configured such that the optical axis $O_1$ of the collimated light source radiation and a normal (N) to the optical filter have the first angle $\alpha1$ unequal to 0°. In specific embodiments, the first angle $\alpha_1 \geq 1°$, like $\alpha_1 \geq 5°$, such as $\alpha_1 \geq 10°$, especially $\alpha_1 \geq 20°$. In embodiments, the first angle $\alpha_1$ may be larger than the acceptance angle of the second collimator. In this way, the reflected (undesired) radiation may be absorbed by the second collimator. In specific embodiments, the first angle $\alpha_1$ may be selected from the range of 10°-50°, such as 20°-40°, like 25°-35°. The acceptance angle (of the second collimator) may be defined as the maximum angle at which incoming radiation may be transmitted (and collimated) by the collimator. Radiation at an incoming angle larger than the acceptance angle may be absorbed by the collimator.

As described above, the optical filter and the second collimator may in specific embodiments be configured under a second angle $\alpha_2$. Especially, $\alpha_2 = \alpha_1$ may apply. Further, especially the optical filter may be configured slanted relative to e.g. an optical axis of the first collimator. Yet further, the optical filter may be configured slanted relative to the second collimator. Especially, the (slanted) optical filter may be configured downstream from the second collimator.

Alternatively, the radiation generating system may in embodiments (further) comprise a wedge-shaped radiation transmissive element. In specific embodiments, the wedge-shaped radiation transmissive element may be positioned between the second collimator and the optical filter. Hence, the wedge-shaped radiation transmissive element may be configured downstream of the second collimator but upstream of the optical filter. The wedge-shaped radiation transmissive element may be a single wedge comprising two planes defining a wedge angle $\alpha_3$. In embodiment, one wedge-shaped radiation transmissive element may be incorporated in the system. Alternatively, an array of wedge-shaped radiation transmissive elements may be incorporated in the system. Each wedge-shaped radiation transmissive element may comprise two planes defining a wedge angle $\alpha_3$. In embodiments, $\alpha_3$=may be selected from the range of 10°-50°, such as 20°-40°, like 25°-35°. In embodiments, the wedge-shaped radiation transmissive element(s) may comprise quartz.

Therefore, in specific embodiments (i) the optical filter (450) and the second collimator (440) are configured under a second angle $\alpha_2$, wherein $\alpha_2$ is selected from the range of 20°-40°; or (ii) an array (490) of wedge-shaped radiation transmissive elements (490), wherein each wedge-shaped radiation transmissive element comprises two planes (491, 492) defining a wedge angle $\alpha_3$, is configured between the optical filter (450) and the second collimator (440), wherein in specific embodiments $\alpha_3$ is selected from the range of 20°-40°.

As described above, the channel walls may comprise a light absorbing material. In embodiments, the light absorbing material may (at least) absorb the wavelengths from the range from which the second wavelength $\lambda_2$ is selected. Especially, all wavelengths produced by the light source from the range from which the second wavelength $\lambda_2$, is selected, may be absorbed by the light absorbing material. In embodiments, the light absorbing material may absorb the wavelengths from the range from which the second wavelength $\lambda_2$, is selected and (part of) the wavelengths from the range from which the first wavelength $\lambda_1$ is selected. This may reduce the efficiency of the radiation generating system, however, it does provide the desired radiation. In specific embodiments the light absorbing material may comprise a functionally absorbing material. In specific embodiments, the light absorbing coating may comprise a functionally absorbing coating. Herein, "functionally absorbing" especially relates to at least absorbing radiation in one or more of the 100-190 nm wavelength range and the 230-280 nm wavelength range. Especially under perpendicular irradiation, at least 20% of the radiation in the indicated ranges may be absorbed. As the light absorbing material may be located on the channel walls of the second collimator, only radiation at an angle larger than the acceptance angle of the second collimator may interact with the light absorbing material.

Additionally or alternatively, the light absorbing material may in embodiments comprise a luminescent material configured to convert at least part of the collimated light source radiation received by the light absorbing material into luminescent material light having a wavelength in the wavelength range of at least 315 nm, such as in specific embodiments in the range of 315-400 nm, especially in the visible wavelength range. Further, especially the light absorbing material may have in embodiments substantially no emission intensity in the 230-280 nm wavelength range. In this way, (part of) the undesired radiation may be converted to desired radiation. Especially, in embodiments the light absorbing material may in embodiments comprise a luminescent material configured to convert at least part of the collimated light source radiation received by the light absorbing material into luminescent material light having a centroid wavelength in the wavelength range of at least 315 nm.

Herein, the term "visible light" especially relates to light having a wavelength selected from the range of 380-780 nm.

The term "centroid wavelength", also indicated as λc, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c=\Sigma\lambda*I(\lambda)/(\Sigma I(\lambda)$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

In specific embodiments, the light absorbing material may comprise a converting material, such as phosphor, which may specifically absorb radiation of the second wavelength $\lambda_2$ and transmit radiation of the first wavelength $\lambda_1$, or have a lower absorption for this first wavelength $\lambda_1$. The converting material may specifically absorb at one or more wavelengths in the range of 100-190 nm. Especially, in specific embodiments the converting material may absorb at one or more wavelengths in the range of 100-190 nm and transmit wavelengths in the range of 190-230 nm. Additionally or alternatively, the converting material may specifically absorb at one or more wavelengths in the range of 230-280 nm. Especially, in specific embodiments the converting material may absorb at one or more wavelengths in the range of 230-280 nm and transmit wavelengths in the range of ≥380 nm, such as ≥400 nm. Hence, in specific embodiments, the light absorbing material may comprise a light absorbing material having a higher absorption for the second wavelength $\lambda_2$ than for the first wavelength $\lambda_1$. The phosphor (or luminescent material) may in embodiments emit at wavelengths selected from the range of 380-780 nm.

As described above, the second collimator may comprise channel walls. In embodiments, the channel walls may be configured in (i) a hexagonal structure, (ii) a square structure, (iii) a rectangular structure, or (iv) a triangular structure. In specific embodiments, the channel walls may be configured in a hexagonal structure, such as a honeycomb structure. In embodiments, the channels may have a channel height ($H_2$), a channel length ($L_2$) and a channel width ($W_2$) wherein the channel height ($H_2$) is the dimension of the channel along the optical axis, which is perpendicular to a channel opening. The channel length ($L_2$) is the longest dimension of the channel opening and the channel width ($W_2$) is the dimension of the channel opening perpendicular to the channel length ($L_2$). In embodiments, The channel height ($H_2$) to channel width ($W_2$ ratio may determine the acceptance angle of the second collimator. In embodiments, the acceptance angle=a $\tan(L_2/H_2)$.

In embodiments, the radiation unit may have an elongated shape having a ratio of a length ($L_1$) and a width ($W_1$) defined as $R_1=L_1/W_1$, wherein $R_1 \geq 2$. Additionally, in embodiments at least a part of a total number of the channel walls may be configured perpendicular to the length ($L_1$). Alternatively, the radiation unit may in embodiments have a ratio $R_1=1$.

In embodiments, the radiation generating system may comprise further optical elements. Especially, the radiation generating system may further comprise a first optical element configured downstream of the optical arrangement. Especially, the first optical element may be configured to redirect the arrangement radiation wherein the arrangement radiation irradiating on the first optical element may have a first FWHM ($FWHM_1$) and a system radiation leaving the first optical element may have a second FWHM ($FWHM_2$), wherein $FWHM_2 \geq FWHM_1$. In embodiments, the first optical element may be configured to redirect light received by the first optical element by one or more of (i) diffuse light received by the first optical element, (ii) refract light received by the first optical element, or (iii) diffract light received by the first optical element. Hence, the first optical element may comprise one or more of (i) a light diffusing optical element, (ii) a light refracting optical element, and (iii) a light diffracting optical element. In specific embodiments, the first optical element may comprise a diffuser. In this invention, the collimators are used for increasing the wavelength selectivity of the optical filter, collimating the light beam may be a side effect. In embodiments, the incident radiation on the first optical element may have the first FWHM ($FWHM_1$), wherein $FWHM_1<7°$, especially $FWHM_1<5°$, more especially $FWHM_1<4°$. Hence, a diffuser may be configured to diffuse the arrangement light. In embodiments, the radiation leaving the first optical element may have the second FWHM (FWHM$_2$), wherein FWHM$_2$>FWHM$_1$, such as FWHM$_2$≥1.5*FWHM$_1$, especially wherein FWHM$_2$≥2*FWHM$_1$. In specific embodiments, FWHM$_2$≥10°, especially FWHM$_2$≥15°, more especially FWHM$_{2≥20}$°. Additionally or alternatively, the first optical element may comprise one or more reflective elements. Additionally or alternatively, the first optical element may comprise one or more optical lenses. In this way, the arrangement light may be redirected. Additionally or alternatively, the first optical element may comprise a collimator. In this way, the light beam of the arrangement light may be further collimated. In embodiments, the optical element may comprise a low back reflection, such as ≤30%, especially ≤20%, more especially ≤15%. In specific embodiments, the beam of radiation leaving the first optical element may be anisotropic.

Therefore, in specific embodiments the first optical element may be configured to broaden the arrangement radiation wherein the arrangement radiation irradiating the first optical element has a primary full width half maximum FWHM$_p$ and wherein the arrangement radiation downstream of the first optical element has secondary full width half maximum FWHM$_s$, wherein FWHM$_s$≥FWHM$_p$, especially FWHM$_s$>FWHM$_p$, such as FWHM$_s$≥1.2*FWHM$_p$, such as FWHM$_s$≥1.5*FWHM$_p$, especially wherein FWHM$_s$≥2*FWHM$_p$. In specific embodiments, the first optical element may be configured to redirect the arrangement radiation wherein the arrangement radiation irradiating the first optical element has a primary full width half maximum FWHM$_p$ and wherein the arrangement radiation downstream of the first optical element has secondary full width half maximum FWHM$_s$, wherein FWHM$_s$≥FWHM$_p$.

Hence, in specific embodiments the (optional) first optical element (configured downstream of the optical arrangement) may especially be configured to redirect light received by the first optical element to a larger spatial distribution than what the first optical component receives. Especially, the larger spatial distribution indicates a broader FWHM.

The system may especially be configured to generate system radiation. In an operational mode, the system radiation comprises at least part of the arrangement radiation, downstream of the optical arrangement. However, it is not excluded that being a final exit window of the system and the optical arrangement further optical elements may be available.

Especially, the system radiation may comprise at least radiation having the first wavelength $\lambda_1$. As indicated above, the light source may provide radiation having a ratio of the spectral powers at $\lambda_1$ and $\lambda_2$ defined as $I_{1,1}/I_{1,2}$. Downstream of the radiation unit, more especially downstream of the optical arrangement, this ratio may be indicated as $I_{2,1}/I_{2,2}$. This ratio may be larger than the ratio $I_{1,1}/I_{1,2}$, due to the optical arrangement, especially the optical filter and the second collimator. The system radiation, in one or more operational modes, generated by the system, may having a ratio of the spectral powers at $\lambda_1$ and $\lambda_2$ defined as $I_{3,1}/I_{3,2}$. The latter ratio may be the same as $I_{2,1}/I_{2,2}$, and will in general also be larger than $I_{1,1}/I_{1,2}$, as the radiation unit, especially the optical arrangement, may be used to change the spectral power distribution of the light source to a more desirable spectral power distribution.

Hence, in embodiments the radiation generating system is especially configured to generate in an operational mode system radiation having radiation at the first wavelength $\lambda_1$, even more especially having a ratio of the spectral powers at $\lambda_1$ and $\lambda_2$ defined as $I_{3,1}/I_{3,2}$, which is larger than a ratio of the spectral powers at $\lambda_1$ and $\lambda_2$ defined as $I_{1,1}/I_{1,2}$ of the light source radiation.

In addition to the UV radiation, the radiation generating system may in specific embodiments further provide radiation having one or more wavelengths in the visible wavelength range. In specific embodiments, to this end the system may comprise one or more of (i) another light source, configured to generate visible radiation, (ii) the above indicated luminescent material, when such luminescent material emits in the visible, and (iii) a light source that not only provides light source radiation in the UV but also in the visible. In this way, the disinfection properties of the radiation generating system may be combined with general lighting and/or spot lighting. Hence, in embodiments, the radiation generating system may comprise a downlighter, an uplighter, a grazing wall lighter, a light bulb, a luminaire, or a spotlight. Especially, the radiation generating system may be configured to generate in an operational mode (i) the system radiation and (ii) visible light. In embodiments, the radiation generating system may be used in hospital lighting, retail lighting, office lighting, industry lighting, school lighting, building lighting. Therefore, in embodiments the radiation generating system may be is configured to generate in an operational mode system radiation having radiation at the first wavelength wherein the radiation generating system comprises a downlighter, an uplighter, a grazing wall lighter, a light bulb, a luminaire, or a spotlight, and wherein the radiation generating system is configured to generate in an operational mode (i) the system radiation and (ii) visible light.

The radiation generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting.

The terms "visible", "visible light" or "visible emission" and similar terms refer to light having one or more wavelengths in the range of about 380-780 nm. Herein, UV may especially refer to a wavelength selected from the range of 100-380 nm, such as 190-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or iPhone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In a further aspect, the invention provides a lamp or a luminaire comprising the radiation generating system as defined herein. The luminaire may further comprise a housing, optical elements, louvres, etc. etc. . . . . The lamp or luminaire may further comprise a housing enclosing the first light generating device, the second light generating device, and the optional third light generating device. The lamp or luminaire may comprise a light window in the housing or a housing opening, through which the system light may escape from the housing.

In yet a further aspect, the invention provides a method for treating at least part of a space or of an object. In embodiments, treating may refer to disinfecting. In embodiments, the method may comprise providing system radiation having the first wavelength $\lambda_1$ in the space or to the object using the radiation generating system. In this way, viruses and/or bacteria may be killed using radiation that may be (relatively) safe for humans.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
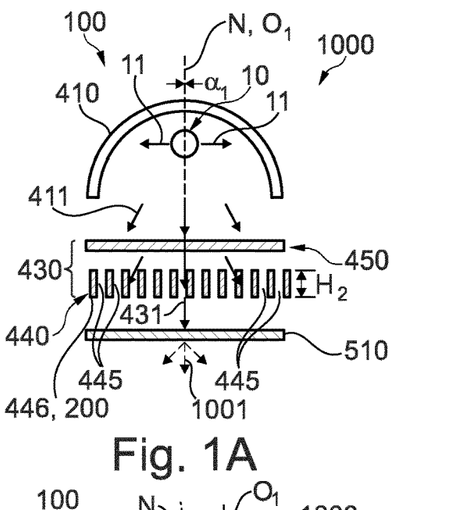
FIGS. 1*a-b* schematically depict embodiments of the system of the invention.
Figure 1B:
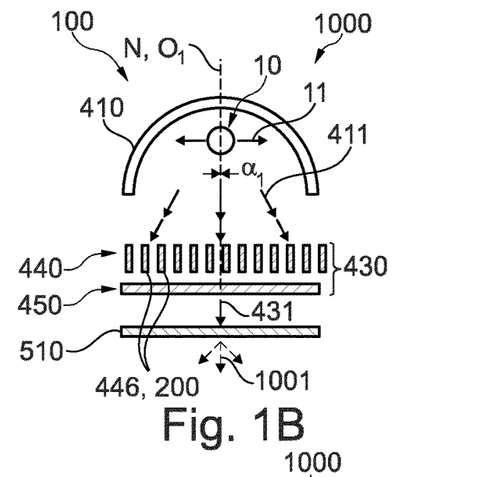

FIG. 1*a-b* schematically depict some aspects of the (UV) radiation generating system 1000. The radiation generating system may comprise a (UV) radiation unit 100. The radiation unit 100 may comprise a light source 10, a first collimator 410, and an optical arrangement 430. The light source 10 may be configured to generate light source radiation 11 having a first spectral power distribution having an intensity $I_{1,1}$ at a first wavelength $\lambda_1$ and an intensity $I_{1,2}$ at a second wavelength $\lambda_2$. In embodiments, the light source 10 may comprise in embodiments an excimer discharge based light source. The first collimator 410 may be configured in a light receiving relationship with the light source 10. The first collimator 410 may be configured to collimate the light source radiation 11 into collimated light source radiation 411. The first collimator 410 may comprise a reflective collimator. The collimated light source radiation 411 and part of the light source radiation 11 may reach the optical arrangement 430.

Figure 4:
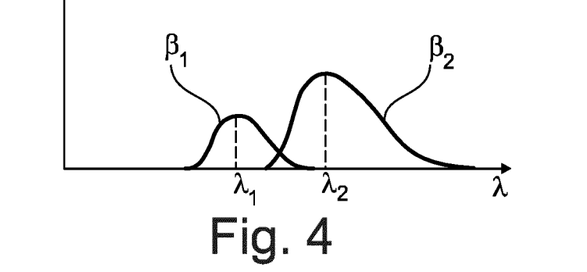
FIG. 4 schematically illustrates the effect of the angle of incidence on an interference filter.

The optical arrangement 430 may be configured downstream of the first collimator 410 and may be configured to convert the collimated light source radiation 411 (and part of the light source radiation 11) into arrangement radiation 431; wherein the arrangement radiation 431 may be collimated relative to the collimated light source radiation 411. The optical arrangement 430 may comprise a second collimator 440 and an optical filter 450. The optical filter 450 may have a higher transmission for the first wavelength $\lambda_1$ than for the second wavelength $\lambda_2$ when irradiated under a predefined angle. The first wavelength $\lambda_1$ may be selected from the range of 190-230 nm and the second wavelength $\lambda_2$ may be selected from the range of 100-190 nm or 230-280 nm. The optical filter 450 may comprise an interference filter. The second collimator 440 may comprise an absorbing collimator. The second collimator 440 may be at least partly defined by a plurality of radiation transmissive channels 445. The radiation transmissive channels 445 may be defined by channel walls 446 which comprise a light absorbing material 200, wherein the light absorbing material 200 is configured to absorb at least part of the collimated light source radiation 411 received by the light absorbing material 200. The second collimator 440 may be configured to absorb radiation having an angle of incidence larger than the predefined angle (or range of angles) of incidence of the optical filter 450. In this way, radiation that may otherwise unintentionally pass the optical filter 450 may now be absorbed by the second collimator 440. This principle may apply either when the second collimator 440 may be configured downstream (FIG. 1a) or upstream (FIG. 1b) of the optical filter 450. The influence of the angle of incidence is indicated in FIG. 4 and described in more detail below.

In the depicted embodiments, an optical axis $O_1$ of collimated light source radiation 411 and a normal N to the optical filter 450 have a first angle $\alpha_1$ equal to 0°. The optical axis $O_1$ of the collimated light source radiation 411 may be defined as an imaginary axis that runs through a center of the light source 10 and through the second collimator 440. Especially, the optical axis may be defined as an imaginary line that defines the path along which light propagates through the system starting from the light generating element, here especially the light source. The optical axis $O_1$ thus may be the central axis of the collimated light source radiation 411. The optical axis $O_1$ may thus be parallel to the radiation transmissive channels 445 and channel walls 446 of the second collimator 440. The normal N to the optical filter 450 may be defined as an axis perpendicular to a surface of the optical filter 450 configured for the incidence of the collimated light source radiation 411.

In embodiments, the light source 10 may especially generate a substantial intensity $I_{1,1}$ at a first wavelength $\lambda_1$ relative to the intensity $I_{1,2}$ at a second wavelength $\lambda_2$. In specific embodiments, the first spectral power distribution may follow $2 \leq I_{1,1}/I_{1,2} \leq 50$, especially $2 \leq I_{1,1}/I_{1,2} \leq 20$.

In embodiments, the radiation generating system 1000 may further comprise a first optical element 510 configured downstream of the optical arrangement 430. The first optical element may be configured to redirect light received by the first optical element 510 by one or more of (i) diffuse light received by the first optical element 510, (ii) refract light received by the first optical element 510, or (iii) diffract light received by the first optical element 510. Especially, the first optical element 510 may be configured to redirect the arrangement radiation 431 wherein the arrangement radiation 431 irradiating on the first optical element 510 may have a first FWHM (FWHM$_1$) and a system radiation 1001 leaving the first optical element 510 may have a second FWHM (FWHM$_2$), wherein FWHM$_2 \geq$ FWHM$_1$. In the depicted embodiment, the first optical element 510 may be configured to diffuse light received by the first optical element 510.

Figure 2A:
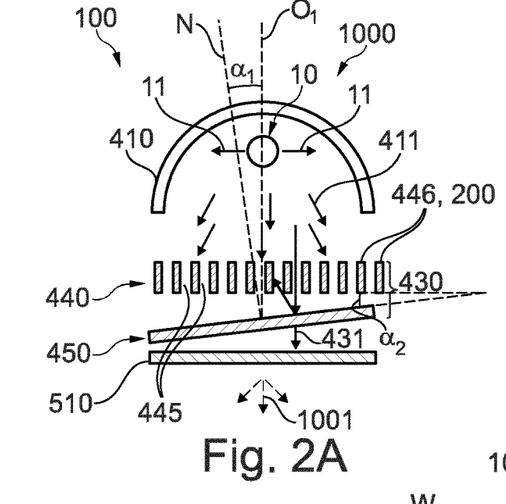
FIGS. 2*a-b* schematically depict further embodiments of the invention.

FIG. 2a depicts an embodiment wherein the optical axis $O_1$ of collimated light source radiation 411 and a normal N to the optical filter 450 have a first angle $\alpha_1$ unequal to 0°. Especially, the first angle $\alpha_1$ may be selected from the range of 20°-40°. The optical filter 450 may be configured under a second angle $\alpha_2$ relative to the second collimator 440, wherein $\alpha_2=\alpha_1$. In this way, radiation that may be reflected by the optical filter 450 may be absorbed by the second collimator 440.

Figure 2B:
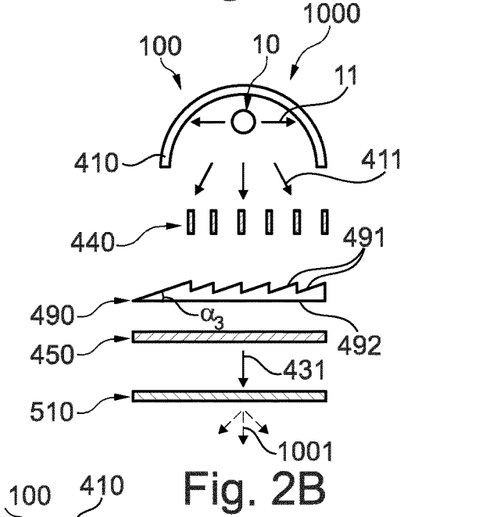

FIG. 2b depicts an embodiment wherein an array of wedge-shaped radiation transmissive elements 490 may be configured between the optical filter 450 and the second collimator 440. The wedge-shaped radiation transmissive elements 490 each comprise two planes 491,492 defining a wedge angle $\alpha_3$, wherein $\alpha_3=\alpha_1$. In embodiments, the wedge-shaped radiation transmissive elements 490 may comprise quartz. Also in this way, radiation that may be reflected by the optical filter 450 may be absorbed by the second collimator 440 as it may enter the second collimator 440 at an angle larger than the acceptance angle of the second collimator 440. Radiation that enters the second collimator 440 at an angle larger than the acceptance angle of the second collimator 440 may be absorbed by the channel walls 446 of the second collimator 440.

Figure 3A:
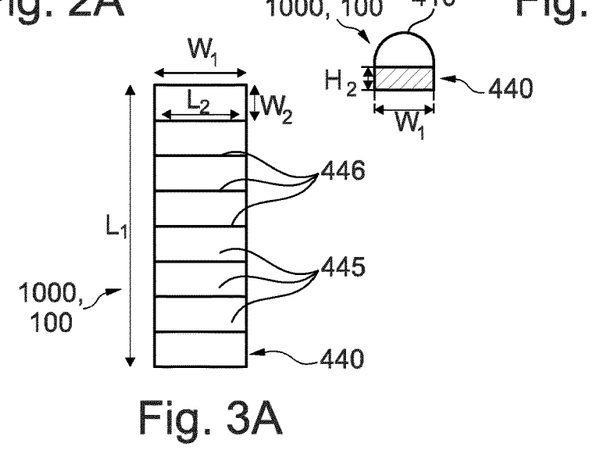
FIGS. 3*a-b* schematically depict schematically depict some aspects of embodiments of the second collimator.

FIG. 3a depicts some further embodiments of the second collimator 440. The second collimator 440 may be at least partly defined by a plurality of radiation transmissive channels 445. The radiation transmissive channels 445 may be defined by channel walls 446. In the depicted embodiment, the radiation unit 100 may have an elongated shape having a ratio of a length $L_1$ and a width $W_1$ defined as $R_1=L_1/W_1$, wherein $R_1 \geq 2$. At least a part of a total number of the channel walls 446 may be configured perpendicular to the length $L_1$. In the depicted embodiment, the channel walls may be configured in a rectangular structure. Alternatively, the channel walls may be configured in (i) a hexagonal structure (such as a honeycomb structure), (ii) a square structure, or (iii) a triangular structure.

Figure 3B:
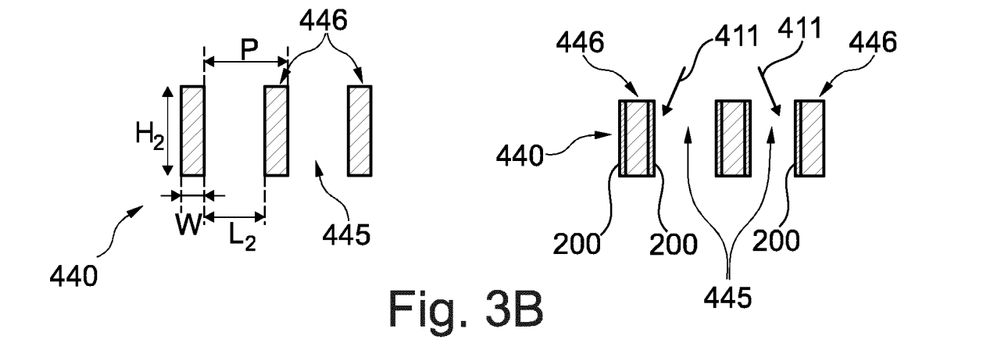

FIG. 3b schematically indicates channel walls 446 of the second collimator 440. The channel walls 446 may have a height $H_2$ and a width W. The channel walls 446 may have a distance corresponding to the channel length $L_2$ between them, channel length $L_2$ may hence be a dimension of the radiation transmissive channels 445. The channel walls 446 may have a pitch P, wherein $P=L_2+W$. In embodiments, the channel walls 446 may comprise a light absorbing material 200. The light absorbing material 200 may be configured to absorb at least part of the collimated light source radiation 411 received by the light absorbing material 200. Especially, the light absorbing material 200 may comprise a functionally absorbing material. Additionally or alternatively, the light absorbing material 200 may comprise a luminescent material configured to convert at least part of the collimated light source radiation 411 received by the light absorbing material 200 into luminescent material light having a wavelength in the wavelength range of at least 315 nm, such as in the range of 315-400 nm, more especially in the visible wavelength range.

FIG. 4 schematically illustrates the effect of the angle of incidence on the interference filter on the transmitted wavelengths of the filter. The y-axis represents the percentage of transmitted radiation. The x-axis represents the wavelength. In the depicted embodiment, at a first angle of incidence $\beta_1$, wherein the first angle of incidence $\beta_1$ is selected from the range of predefined angles from the specific optical filter, a range of wavelengths is transmitted by the optical filter having a maximum transmission at the first wavelength $\lambda_1$. The range of predefined angles from the optical filter is the range of incidence angles radiation may have in order for the filter to accurately filter the radiation. For radiation having a second angle of incidence $\beta_2$, wherein the second angle of incidence $\beta_2$ is outside the range of predefined angles from the specific optical filter, a range of wavelengths is transmitted by the optical filter having a maximum transmission at the first wavelength $\lambda_2$. In this latter case, undesired radiation may pass the optical filter. The system of the present invention prevents the shift from transmitted radiation by incorporation of the second collimator and hence avoiding angles of incidence outside the range of predefined angles from the optical filter.

Figure 5:
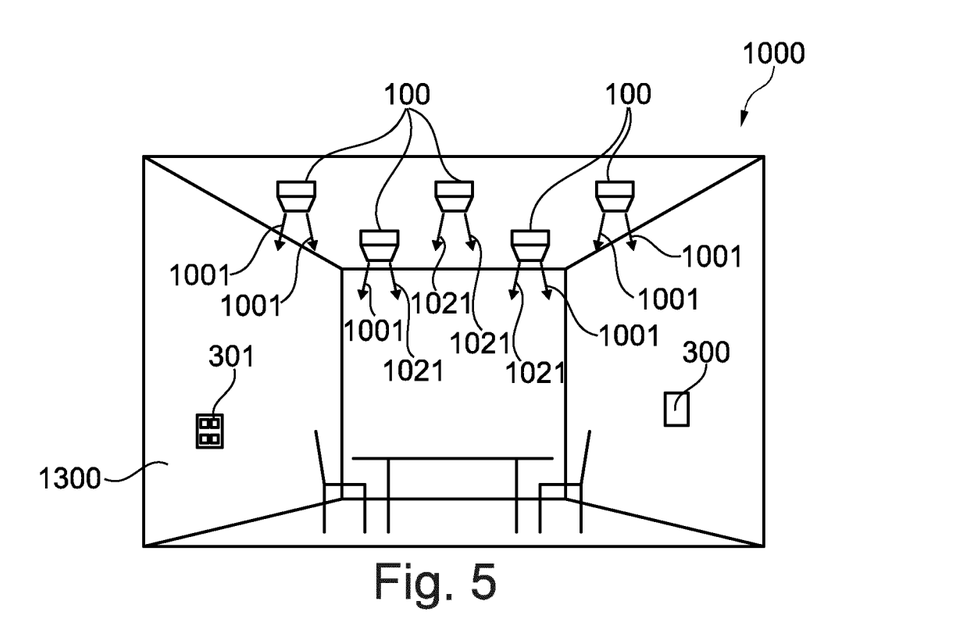
FIG. 5 schematically depicts an embodiment of the system of the invention. The schematic drawings are not necessarily to scale.

FIG. 5 schematically depicts an embodiment of a radiation generating system 1000 comprising a radiation units 100 configured to generate in an operational mode (i) the system radiation 1001, and (ii) visible light 1021. The system radiation 1001 may comprise one or more wavelengths selected from the range of 190-230 nm. In specific embodiments, the radiation unit 100 is configured to generate radiation 1021 having one or more wavelengths in the visible wavelength range. Especially, the system 1000 may be configured to generate in an operational mode white system light. For instance, the system 1000 may comprise a downlighter or a spotlight.

FIG. 5 schematically depicts an embodiment of the system 1000 comprising a plurality of radiation units 100. In specific embodiments, the radiation units 100 may be comprised by downlighters, uplighters, grazing wall lighters, light bulbs, luminaires or spotlights. Here a space 1300 is shown, such as an office or living room, etc. Reference 300 indicates a control system. Reference 301 indicates a user interface.

Hence, amongst others the invention provides a method for treating at least part of a space 1300, wherein the method comprises providing one or more of (i) the system radiation 1001, and (ii) visible light 1021 in the space 1300.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

UV light sources may be used for disinfection purposes. It seems desirable to use far UV (200-222 nm) as this range may be safer than UV-C 254 nm for humans because of a lower penetration depth of this type of radiation.

However, Far UV light sources such as Excimer lamps also produce unsafe light outside the wavelength range of 200-222 nm. A filter may be used to reduce the 'non-far UV light'. However, still some non-far UV light may be transmitted through the filter which may limit the dose of the disinfection system or may hamper its use in some applications.

The present invention describes a radiation generating system comprising an optical arrangement for a far UV light source to filter out undesired/unsafe wavelengths. The disinfection system may comprise a (UV) light source, a first (light reflective) collimator, an optical filter, a second (light absorbing) collimator and optionally an optical element. The light source may provide light source light having a first spectral distribution and a first angular distribution. The reflective collimator e.g. a reflector may collimate the light source light having the first angular distribution into a second angular distribution narrower than said first spatial distribution (note: the spatial distribution may be wider: the apparent source size may increase). The light source light having the second angular distribution may impinge on the filter and the filter may filter out a part of the first spectral distribution resulting in a second spectral distribution. The light having the second spectral distribution and second angular distribution may then impinge on the light absorbing collimator to absorb part of the second spectral distribution and thus transmitting light having a third spectral distribution. The second angular distribution may also be affected because only light at larger angles than the acceptance angle may be absorbed and thus resulting in a third angular distribution. The light having the third spectral distribution and third angular distribution may impinge on the optional optical element to alter the light from a third angular distribution into a fourth angular distribution which may be broader than the (second and) third angular distribution and may be narrower than the first angular distribution.

In case of interference filters, the blocked part of the spectrum may be reflected back into the luminaire. This may cause recycling of the unwanted part of the spectrum which may have a second chance to pass though the filter which may reduce the effectiveness of the filter. By tilting the optical filter, the unwanted part of the spectrum that is reflected back into the luminaire may be changed in direction and absorbed in the second (absorbing) collimator. This may also work in case the filter is placed before the absorbing collimator.

The invention claimed is:

1. A radiation generating system comprising a radiation unit, wherein the radiation unit comprises a light source, a first collimator, and an optical arrangement, wherein:
    the light source is configured to generate light source radiation having a first spectral power distribution having an intensity $I_{1,1}$ at a first wavelength $\lambda_1$ and an intensity $I_{1,2}$ at a second wavelength $\lambda_2$;
    the first collimator is configured in a light receiving relationship with the light source, wherein the first collimator is configured to collimate the light source radiation into collimated light source radiation;
    the optical arrangement is configured downstream of the first collimator (and is configured to convert the collimated light source radiation into arrangement radiation; wherein the arrangement radiation is collimated relative to the collimated light source radiation; wherein the optical arrangement comprises a second collimator and an optical filter, wherein:
    the second collimator is configured downstream or upstream of the optical filter;
    the optical filter has a higher transmission for the first wavelength $\lambda_1$ than for the second wavelength $\lambda_2$ when irradiated under a predefined angle;
    the first wavelength $\lambda_1$ is selected from the range of 190-230 nm and the second wavelength $\lambda_2$ is selected from the range of 100-190 nm or 230-280 nm; and
    the second collimator is at least partly defined by a plurality of radiation transmissive channels(s), wherein the radiation transmissive channels are defined by channel walls which comprise a light absorbing material, wherein the light absorbing material is configured to absorb at least part of the collimated light source radiation received by the light absorbing material, wherein $2 \leq I_{1,1}/I_{1,2} \leq 100$.

2. The radiation generating system according to claim 1, wherein $2 \leq I_{1,1}/I_{1,2} \leq 20$.

3. The radiation generating system according to claim 1, wherein the second collimator is configured downstream of the optical filter, and wherein the optical filter comprises an interference filter.

4. The radiation generating system according to claim 1, wherein the second collimator is configured upstream of the optical filter; and wherein the optical filter comprises an interference filter.

5. The radiation generating system according to claim 1, wherein the radiation generating system is configured such that an optical axis(s) of collimated light source radiation) and a normal to the optical filter have a first angle $\alpha_1$ unequal to 0°.

6. The radiation generating system according to claim 5, where the first angle $\alpha_1$ is selected from the range of 20°-40°.

7. The radiation generating system according to claim 1, wherein:
    the optical filter and the second collimator are configured under a second angle $\alpha_2$, wherein $\alpha_2$ is selected from the range of 20°-40°; or
    an array of wedge-shaped radiation transmissive elements, wherein each wedge-shaped radiation transmissive element comprises two planes defining a wedge angle $\alpha_3$, is configured between the optical filter and the second collimator, wherein $\alpha_3$ is selected from the range of 20°-40°.

8. The radiation generating system according to claim 1, wherein the light source comprises an excimer discharge based light source.

9. The radiation generating system according to claim 1, wherein the light absorbing material comprises a functionally absorbing material at least absorbing radiation in one or more of the 100-190 nm wavelength range and the 230-280 nm wavelength range.

10. The radiation generating system according to claim 1, wherein the light absorbing material comprises a luminescent material configured to convert at least part of the collimated light source radiation received by the light absorbing material into luminescent material light having a centroid wavelength in the wavelength range of at least 315 nm.

11. The radiation generating system, according to claim 1, wherein the channel walls are configured in a honeycomb structure.

12. The radiation generating system according to claim 1, wherein the radiation unit has an elongated shape having a ratio of a length and a width defined as $R_1=L_1/W_1$, wherein $R_1 \geq 2$, wherein at least a part of a total number of the channel walls are configured perpendicular to the length.

13. The radiation generating system according to claim 1, further comprising a first optical element configured downstream of the optical arrangement, wherein the first optical element is configured to redirect the arrangement radiation (wherein the arrangement radiation irradiating the first optical element has a primary full width half maximum $FWHM_p$ and wherein the arrangement radiation downstream of the first optical element has a secondary full width half maximum $FWHM_s$, wherein $FWHM_s > FWHM_p$.

14. The radiation generating system according to claim 1, wherein the radiation generating system is configured to generate in an operational mode system radiation having radiation at the first wavelength $\lambda_1$, wherein the radiation generating system comprises a downlighter, an uplighter, a grazing wall lighter, a light bulb, a luminaire, or a spotlight, and wherein the radiation generating system is configured to generate in an operational mode the system radiation and visible light.

15. A method for treating at least part of a space or of an object, wherein the method comprises providing system radiation having the first wavelength $\lambda_1$ in the space or to the object using the radiation generating system as defined in claim 1.

* * * * *